No. 677,817. Patented July 2, 1901.
E. THACHER.
SLIDE RULE.
(Application filed Feb. 27, 1900.)
(No Model.)
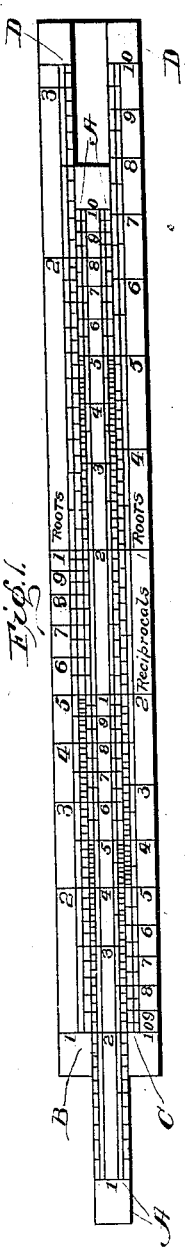
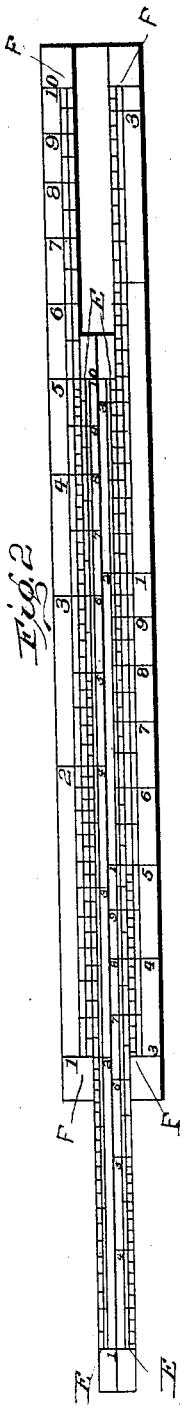
Witnesses:
J. M. Fowler Jr
Nellie E. Harris
Edwin Thacher
Inventor:
By W. C. Carman
Attorney

UNITED STATES PATENT OFFICE.

EDWIN THACHER, OF PATERSON, NEW JERSEY, ASSIGNOR OF ONE-HALF TO EDSON M. SCOFIELD, OF YOUNGSTOWN, OHIO.

SLIDE-RULE.

SPECIFICATION forming part of Letters Patent No. 677,817, dated July 2, 1901.

Application filed February 27, 1900. Serial No. 6,717. (No model.)

*To all whom it may concern:*

Be it known that I, EDWIN THACHER, a citizen of the United States, residing at Paterson, in the county of Passaic and State of New Jersey, have invented certain new and useful Improvements in Slide-Rules; and I do hereby declare the following to be a full, clear, and exact description of the invention, such as will enable others skilled in the art to which it appertains to make and use the same.

My invention relates to calculating logarithmic slide-rules, and has for its object a greater convenience in handling, a greater speed in a variety of calculations, and a greater range of useful calculations than can be found with any slide-rule now in the market. The logarithmic scales may be stamped or engraved on the rule or they may be printed on paper, celluloid, or other material and attached to the side or sides of the rule, as is thought most desirable in manufacture. The slide or slides admit of an easy movement back and forth to the right or left between the fixed lines of the rule, so that any number or division on the slides may be brought opposite to or in contact with any desired number or division on the fixed lines, admitting of accurate and rapid setting or reading without the aid of a runner.

Figures 1 and 2 represent a slide-rule illustrative of my invention and showing the slide or slides partly drawn out to the left. Fig. 3 shows a section of the rule with two slides, one on each side of the rule, Fig. 1 or its equivalent occupying one side of the rule, and Fig. 2 or its equivalent the other side of the rule. Fig. 4 shows a section of the rule with one slide only. On this rule either Fig. 1 or Fig. 2 is used, the two being used independently or on different rules.

In Figs. 1 and 2, A, B, C, D, E, and F represent logarithmic scales—that is, scales in which the distance of any number from the beginning of the scale corresponds to the mantissa of the logarithm of that number. Such scales are laid off in prime divisions from "1" to "10," each prime division being subdivided as finely as desired and depending upon the length of the rule. For a twenty-two-inch rule I would prefer to have each prime division subdivided as follows: scales A, B, and C, from "1" to "5," fifty parts; from "5" to "10," ten parts; scales D, E, and F, from "1" to "2," one hundred parts; from "2" to "5," fifty parts; from "5" to "10," twenty parts. Some of these divisions are omitted from the drawings for the sake of clearness, the number and fineness of the subdivisions being optional with the manufacturer. These numbers or the values of the divisions represented thereby are purely arbitrary. Thus "2" on the scales may mean two, twenty, two hundred, or .2, .02, .002, &c., as the nature of the problem to be solved may require. Such scales represent the logarithms of all numbers, the accuracy of the reading depending upon the length of scale employed and the number of its subdivisions. The manner of using such scales for making computations is well understood and need not here be described in detail.

In Fig. 1 scales A, B, and C have a length equal to half the graduated length of the rule, scales A and B being laid off from left to right and scale C from right to left, as shown, the numbers on scale C being the reciprocals of the numbers opposite on scale B. Scales B and C occupy the fixed lines on the left half of the rule, and scale A occupies the entire slide, being laid off twice on each edge of slide, or four times altogether. Scale D is a scale of roots and has a length equal to the graduated length of the rule and is divided into two parts of equal length. The first part gives all numbers from "1" to "$\sqrt{10}$" and the second part all numbers from "$\sqrt{10}$" to "10." These parts are laid off on the fixed lines of the right half of the rule, one at top and the other at bottom, the two roots of any number on the slide being opposite to each other on the fixed lines. By this arrangement by moving the slide to the left any number on scales A may be brought opposite any required number on scales B or C without moving the end of the slide beyond the center line of the rule, and when so set complete logarithmic scales A, B, and C will be found in contact for direct comparison. Consequently the scales being set for any given ratio such ratio may be multiplied by any possible number within the reading limits of such scales, and the results be read without a resetting of the rule. By moving the slide to the right any number on scale A may be brought opposite any desired number on scale D without moving the slide beyond the center line of the rule, and when so set complete logarithmic scales A and D will be found in contact for direct comparison. When scales A and B or A and C are set in any desired position with respect to each other and a full scale D is then desired in contact with a full scale A, the slide is moved to the right one-half its length, or the length of scale A. In order to bring scale A into direct contact with scales B, C, and D, I prefer the arrangement shown in Fig. 1; but it may be accomplished by reversing the arrangement, the scales A being on the fixed lines and the scales B, C, and D on the slide.

In Fig. 2 scale F on the top fixed line is a complete and continuous scale occupying the graduated length of the rule, beginning on the left and ending on the right. On the bottom fixed line this scale begins and ends at the center of the rule, the first half of the scale occupying the right half of the rule and the last half of the scale the left half of the rule, "1" or "10" on the top fixed line being opposite "$\sqrt{10}$" on the bottom fixed line. This gives a complete scale on each half of the fixed lines of the rule to the right or left of the center, on the left the first half being at the top and the last half at bottom, and on the right the first half being at bottom and the last half at top. Scales E on the slide are of the same length and divided and arranged in the same manner as the adjacent scales F on the fixed lines, and when the ends of scales E and F are brought opposite to each other scale E on top edge of slide will match scale F on top fixed line, and scale E on bottom edge of slide will match scale F on bottom fixed line, there being a complete scale E on each half of the slide to the right or left of the center. By moving the slide to the right or left any required number on scale E may be brought opposite any required number on scale F without moving the end of the slide beyond the center line of the rule, and when so set complete logarithmic scales E and F will be found in contact for direct comparison. Consequently the scales being set for any given ratio such ratio may be multiplied by any possible number within the reading limits of such scales and the results be read without a resetting of the rule. As scales E and F each have a length equal to the total graduated length of the rule and as the length of rule in all rules without a runner has heretofore been twice the length of scale, Fig. 2 gives without the aid of a runner a four-foot rule on a two-foot stick, resulting in much greater speed in operating than is possible with rules requiring a runner and much greater accuracy of results than can be obtained with rules requiring no runner.

Fig. 1 shows an arrangement of scales or a rule adapted to the working of the following general formulas by the following general rules:

$$\frac{a\,x}{b},\ \frac{a\,x^2}{b},\ \frac{a\,x}{b^2},\ \frac{a\,x^2}{b^2},\ \text{slide direct.}$$
$$\frac{b\,a}{x},\ \frac{b^2\,a}{x},\ \frac{b\,a}{x^2},\ \frac{b^2\,a}{x^2},\ \text{slide reversed.} \quad (1)$$

Rule 1: Opposite $b$ on $\begin{cases} \text{B, if first power,} \\ \text{D, if second power,} \end{cases}$ set $a$ on A. Then opposite $x$ on $$\begin{cases} \text{B, if first power,} \\ \text{D, if second power,} \end{cases}$$

find answer on A.

$$\sqrt{\frac{b\,x}{a}} \text{ and } \sqrt{\frac{b^2\,x}{a}},\ \text{slide direct.}$$
$$\sqrt{\frac{b\,a}{x}} \text{ and } \sqrt{\frac{b^2\,a}{x}},\ \text{slide reversed.} \quad (2)$$

Rule 2: Opposite $b$ on $\begin{cases} \text{B, if first power,} \\ \text{D, if second power,} \end{cases}$ set $a$ on A. Then opposite $x$ on A read answer on D.

$$c\,a\,x \text{ and } c\,a\,x^2,\ \text{slide direct.} \quad (3)$$

Rule 3: Opposite $c$ on C set $a$ on A. Then opposite $x$ on $\begin{cases} \text{B, if first power,} \\ \text{D, if second power,} \end{cases}$ find answer on A.

$$\frac{a}{b\,x} \text{ and } \frac{a}{b^2\,x},\ \text{slide direct.} \quad (4)$$

Rule 4: Opposite $b$ on $\begin{cases} \text{B, if first power,} \\ \text{D, if second power,} \end{cases}$ set $a$ on A. Then opposite $x$ on C find answer on A.

$$\sqrt{\frac{x}{c\,a}},\ \text{slide direct.} \quad (5)$$

Rule 5: Opposite $c$ on C set $a$ on A. Then opposite $x$ on A find answer on D.

The preceding formulas are readily solved by the rules given. In these formulas $a$, $b$, and $c$ may have any value; but the slide must be set as often as their value is changed. $x$ is not used in setting and may have any number of values without resetting. This feature is of great value in all prorata questions, stresses, sections, &c.; in fact, a very large percentage of all calculations. The formulas are general. If, for example, in the formula $\frac{a\,x}{b}\,b = 1$, it becomes $a\,x$, or multiplication. If $a = 1$, it becomes $\frac{x}{b}$, or division, and if $a$ and $b$ have a value different from 1 it is proportion, and the same applies to all other formulas.

Fig. 1 shows the slide drawn out to the left, so that "2" on A is opposite "1" on B, and a few examples in application of the rules will be given for the slide in this position:

$$\frac{a\,x}{b} = \frac{2\times 4}{1} = 8.0, \quad \frac{1\times 20}{5} = 4.0,$$
$$\frac{6\times 9}{3} = 18.0, \text{ \&c.}$$
$$\frac{a\,x^2}{b} = \frac{6\times 4^2}{3} = 32.0, \frac{1\times 6^2}{5} = 7.2,$$
&c.
$$\frac{a\,x^2}{b^2} = \frac{3.2\times 8.0}{4^2} = 1.6, \frac{8.0\times 6.0}{2^2} =$$
$$12.0, \text{ \&c.}$$
$$\frac{a\,x^2}{b^2} = \frac{7.2\times 4^2}{6^2} = 3.2, \frac{3.2\times 20^2}{4^2} =$$
$$80.0, \text{ \&c.}$$
} By Rule 1.

$$\sqrt{\frac{b\,x}{a}} = \sqrt{\frac{3\times 8}{6}} = 2.0, \sqrt{\frac{b^2\,x}{a}} =$$
$$\sqrt{\frac{6^2\times 8}{7.2}} = 6.33, \text{ \&c.}$$
} By Rule 2.

$$c\,a\,x = 5\times 4\times 3 = 60.0, c\,a\,x^2 =$$
$$5\times 4\times 4^2 = 320.0.$$
} By Rule 3.

$$\frac{a}{b\,x} = \frac{80}{4\times 2.5} = 8.0, \frac{a}{b^2\,x} = \frac{320.0}{4^2\times 8} =$$
$$2.5, \text{ \&c.}$$
} By Rule 4.

$$\sqrt{\frac{x}{c\,a}} = \sqrt{\frac{80.0}{5\times 4}} = 2.0, \sqrt{\frac{800}{5\times 4}} =$$
$$6.32, \text{ \&c.}$$
} By Rule 5.

Fig. 2 shows a rule adapted to the working of the general formula $\frac{e\,x}{f}$, embracing all operations in multiplication, division, and proportion with greater accuracy than can be obtained by Fig. 1, the scales being of double length, and as such operations are required much more frequently than those in which powers and roots are involved the equal rapidity of working, combined with greater accuracy of results, becomes important. The formula $\frac{e\,x}{f}$ (6) is worked by the following general rule:

Rule 6: Opposite $f$ on F set $e$ on E. Then opposite $x$ on F find answer on E.

In the formula $\frac{e\,x}{f}$ $x$ is not used in setting and may have any number of values without resetting.

Fig. 2 shows the slide drawn out to the left, so that "2" on E is opposite "1" on F, and a few examples in application of Rule 6 will be given for the slide in this position:

$$\frac{e\,x}{f} = \frac{2\times 6}{1} = 12.0, \frac{1\times 40}{5} = 8.0, \frac{6\times 13}{3} = 26.0, \text{ \&c.}$$

What I claim as my invention, and wish to secure by Letters Patent, is—

1. A slide-rule, comprising a plurality of logarithmic scales relatively adjustable, one of said scales formed of two parts, one above the other, having a combined length equal to the graduated length of the rule, substantially as described.

2. A slide-rule, comprising a plurality of logarithmic scales relatively adjustable, one of said scales formed of two equal parts, one above the other, having a combined length equal to the graduated length of the rule, and arranged upon one side of the transverse center of the rule, substantially as described.

3. A slide-rule, comprising a fixed and movable logarithmic scale arranged upon one side of the transverse center of the rule, said fixed scale being composed of two equal parts, one above the other, having a combined length equal to the graduated length of the rule, and said movable scale being formed of one part having a length equal to one-half the graduated length of the rule, and being laid off on each edge of the slide, substantially as described.

4. A slide-rule, comprising fixed or movable logarithmic scales as follows: a direct scale of roots composed of two equal parts arranged one above the other upon one side of the transverse center of the rule (whether base or slide) and having a combined length equal to the graduated length of the rule, in combination with a direct and a reversed scale of squares each composed of one part having a length equal to one-half the graduated length of the rule and arranged upon the opposite side of the transverse center of the rule, the direct scales reading from left to right and the reversed scale reading from right to left, substantially as described.

5. A slide-rule, composed of base and slide members, bearing the following logarithmic scales, viz: scale A upon each side of the transverse center of the slide, and upon each edge thereof, reading from left to right; scale B upon one side of the transverse center of the base, reading from left to right; scale C upon the same side of the transverse center of the base, reading from right to left; scale D arranged in two equal parts, one above the other, upon the opposite side of the transverse center of the base, reading from left to right; each of said scales A, B and C having a length equal to one-half the graduated length of the rule, and scale D having a combined length equal to the graduated length of the rule, substantially as described.

In testimony whereof I subscribe my signature in presence of two witnesses.

EDWIN THACHER.

Witnesses:
 EDWARD F. MENEY,
 WOOD MCKEE.